United States Patent Office 3,240,823
Patented Mar. 15, 1966

3,240,823
PREPARATION OF NITROOLEFINS
Giovanni A. Bonetti, Wilmington, Del., James J. Gavigan, Philadelphia, Pa., Hans O. Hansen, Willingboro, N.J., and Rudolph Rosenthal, Broomall, Pa., assignors to The Atlantic Refining Company, Philadelphia, Pa., a corporation of Pennsylvania
No Drawing. Filed Apr. 8, 1965, Ser. No. 446,729
12 Claims. (Cl. 260—644)

This invention relates to a method for preparing nitroolefins from dinitroparaffins, nitroalcohols, nitronitrites or mixtures thereof. In particular, this invention relates to a method for preparing nitroolefins by contacting dinitropaparffins. nitroalcohols, nitronitrites, or mixtures thereof with a alumina-containing catalyst.

It has long been known that nitrogen tetroxide or an equilibrium mixture of $NO_2$ and $N_2O_4$ may be added to an olefin to produce a mixture of the corresponding nitronitrites and dinitroparaffins. When this reaction is carried out in a paraffinic hydrocarbon solvent having from 6 to 24 carbon atoms in the molecule at temperatures in the range of from about 50° C. to about 150° C. byproduct formation can be minimized such that the mixture of nitronitrite and dinitroparaffin is substantially the only product formed and with these compounds being in an approximately 1:1 weight ratio.

Heretofore it has been proposed to convert the crude nitronitrite-dinitroparaffin mixture into nitroolefins by the use of ammonia or urea under anhydrous conditions. However, if a straight chain alpha-olefin is nitrated the resulting mixture of straight chain compounds cannot be converted to nitroolefins by this method except with substantial loss to various undesirable and useless byproducts. It is also well known that nitronitrites may be readily hydrolyzed either with low molecular weight alcohols or with water to the corresponding nitroalcohols and accordingly, the crude nitronitrite-dinitorparaffin mixture could be converted to a nitroalcohol-dinitroparaffin mixture by hydrolysis. It is known that pure dinitroparaffins may be converted at very high yields to nitroolefins by the use of an aqueous slurry of an alkaline earth oxide such as calcium oxide. If, however, other nitro compounds were in admixture with the dinitroparaffins, this process would result in considerable degradation of the nitroalcohol in the admixture and thus there would be a loss of yield of desirable products.

It now has been found that dinitroparaffins, nitroalcohols, or nitronitrites or mixtures thereof may be converted to their corresponding nitroolefins at high yields without degradation or loss to undesirable products by contacting one or more of these nitro compounds with an alumina-containing catalyst. Thus the dinitroparaffin-nitronitrite mixture resulting from the nitration of an alpha-olefin may be converted directly to the corresponding 1-nitroolefin or the hydrolyzed product obtained by hydrolyzing the dinitroparaffin-nitronitrite mixture, i.e. the dinitroparaffin-nitroalcohol mixture may be converted to the corresponding 1-nitroolefin in accordance with this invention.

It is an object of this invention, therefore, to provide a method for the preparation of nitroolefins from dinitroparaffins, nitroalcohols, or nitronitrites or mixtures thereof.

It is another object of this invention to provide a method for the preparation of nitroolefins from dinitroparaffins, nitroalcohols or nitronitrites or mixtures thereof at high yields and without loss or degradation to undesirable products.

Other objects of this invention will be apparent from the description and claims that follow.

In order to attain the objects of this invention the dinitroparaffin, nitroalcohol, nitronitrite or the mixture of two or more of these compounds is contacted with an alumina-containing catalyst at a temperature in the range of from 25° C. to 140° C.

In accordance with this invention nitroolefins having at least three carbon atoms in the molecule and the formula

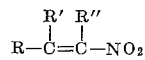

are prepared from the corresponding nitro compounds, i.e. the dinitroparaffins having the formula

the nitroalcohols having the formula

or the nitronitrites having the formula

or mixtures thereof wherein R is hydrogen, an alkyl radical having from 1 to 24 carbon atoms, an aralkyl radical having not more than 22 carbon atoms, an aryl radical, or an alkaryl radical having not more than 22 carbon atoms; and R' and R" are each selected from the group consisting of hydrogen and alkyl radicals having from 1 to 4 carbon atoms which also may be joined together to form a ring. Since the nitroolefin must have at least three carbon atoms in the molecule R, R' and R" cannot all be hydrogen simultaneously.

When R is methyl and R' and R" are hydrogen the nitro compounds are prepared by nitrating propylene. When this is carried out with a mixture of $NO_2$ and $N_2O_4$ at about 50° C. in a solvent such as 2,2,4-trimethylpentane there is obtained a mixture of the 1-nitro-2-propanol-nitrite and the 1,2-dinitropropane, which mixture in accordance with this invention, may be converted directly into the corresponding nitroolefin or the mixture may be hydrolyzed, for example with methanol at ambient temperatures to produce a mixture of the 1,2-dinitropropane and 1-nitro-2-propanol. This mixture also may be converted directly to the corresponding nitroolefin in accordance with this invention. If a higher alpha-olefin is employed, for example hexadecene-1, upon nitration there will be obtained the 1,2-dinitrorexadecane and the 1-nitro-2-hexadecanolnitrite. This mixture also may be converted to the nitroolefin, i.e. 1-nitrohexadecene-1 in accordance with this invention or the mixture may be hydrolyzed with water at about 80° C. to produce 1,2-dinitrohexadecane and 1-nitrohexadecanol-2. This latter mixture also may be converted directly to the nitroolefin in accordance with the instant invention.

Styrene may be nitrated to produce the 1-phenyl-1,2-dinitroethane and the 1-phenyl-2-nitroethylnitrite, which mixture may be converted directly to produce the corresponding nitroolefin, i.e. beta-nitrostyrene by this invention, or the mixture of the dinitro compound and the nitronitrite may be hydrolyzed to give the dinitro compound and the nitroalcohol, i.e. 1-phenyl-1-hydroxy-2-nitroethane, which mixture also may be converted to the beta-nitrostyrene by the instant method.

In a similar manner alpha-methylstyrene can be nitrated and converted to its corresponding nitroolefin. In this example in the general formula R is a phenyl group and R' is methyl. If alpha-methyl-para-methylstyrene is employed the R of the general formula is an alkaryl group and the R' is methyl.

If, in the general formula, R is hydrogen and R' and R" are joined to form a ring, the starting olefin may be, for example, cyclohexene. When this olefin is nitrated there is obtained a mixture of the dinitro compound and the nitronitrite. Again these may be converted directly to the nitroolefin or if the mixture is hydrolyzed to form a mixture of the dinitro compound and nitroalcohol, that mixture may be converted to the nitroolefin (1-nitrocyclohexene) having the formula

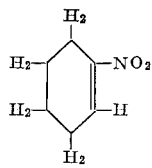

The alumina-containing catalyst which may be utilized for converting the dinitroparaffins, nitroalcohols, and nitronitrites into the corresponding nitroolefins are alumina, silica-alumina and silica-alumina-magnesia.

The alumina which is suitable is the activated alumina as opposed to the tabular or alpha-alumina having a very low surface area which are porcelain-like in character. The activated aluminas are also sometimes designated the gamma aluminas. These are well known commercially available catalysts.

The silica-aluminas suitable for use are the silica-alumina hydrocarbon cracking catalysts. The silica-alumina cracking catalysts are available commercially containing from 7 percent to 50 percent by weight of alumina, the remainder being silica. The commercial synthetic silica-alumina cracking catalysts containing from 12 percent to 30 percent by weight of alumina which are currently employed by the petroleum industry in cracking processes are particularly suitable for the instant invention. A particularly preferred catalyst which is commercially available contains about 25 percent of alumina and 75 percent of silica. Similarly, the natural clay type silica-alumina cracking catalysts produced by the acid treatment of montmorillonite clays also may be employed. These too are available commercially and are utilized in petroleum catalytic cracking processes.

The third alumina-containing catalyst, i.e. the silica-alumina-magnesia cracking catalyst also is a commercially available material wherein the proportions of silica, alumina and magnesia may vary within relatively wide ranges. In general, however, the alumina will range within the same general ranges as in the silico-alumina catalysts with the magnesia being present in minor amounts. A commercially available catalyst for example contains 85 weight percent silica, 12 weight percent alumina and 3 weight percent magnesia.

The heretofore described alumina-containing catalysts in the condition in which they are obtained commercially from the manufacturer are active for the conversion of the nitro compounds to the nitroolefin. It has been found, however, that when these catalysts are employed in continuous reactions in the form of a fixed bed they gradually lose their activity for this conversion reaction. This activity can be maintained or restored by the use of minor amounts of water. For example, the water may be introduced continuously together with the reactants or it may be introduced intermittently. The amount of water required is not critical since it need only be sufficient to prevent the catalyst from becoming anhydrous, thus an amount ranging from about 0.1 percent to 10 percent by volume based on the volume of the solution passed over the catalyst has been found to be sufficient to maintain the activity of the catalyst. Larger amounts may be employed when converting dinitroparaffins, but if nitroalcohols are being converted the excess water will reduce the conversion.

Although the conversion reaction may be carried out in the absence of a solvent, for ease of handling and in order to reduce undesired side reactions which would lower the yield of the desired nitroolefin it has been found preferable to carry out the reaction by dissolving the nitro compound, i.e. the dinitorparaffin, nitroalcohol or nitronitrite or mixtures thereof in a suitable solvent and thereafter contacting the nitro compound with the alumina-containing catalyst. Solvents which are suitable include the aliphatic hydrocarbons, aromatic hydrocarbons such as benzene, toluene, the xylenes and the like, mixtures of aliphatic and aromatic hydrocarbons with t-butyl alcohol or a mixture of acetone and ethyl alcohol. The preferred aliphatic hydrocarbons contain from 6 to 24 carbon atoms in the molecule and may be normal, cyclic or branched hydrocarbons. Examples are n-hexane, cyclohexane, methylcyclohexane, n-heptane, n-octane, isooctane, n-nonane, n-decane, undecanes, dodecanes, tridecanes, tetradecanes, pentadecanes, hexadecanes and the like. The choice of solvent will depend upon the solubility of the nitro compound being converted and the temperature at which it is desired to carry out the conversion reaction.

The preferred concentration of the nitro compound in the solvent is in the range of from 1 to 50 grams per 100 ml. of solvent and preferably from 10 to 20 grams per 100 ml. of solvent. The reaction is carried out preferably at atmospheric pressure at a temperature in the range of from 25° C. to 140° C. and preferably at a temperature in the range of from 60° C. to 110° C. Contact times ranging from 15 seconds to several hours may be employed and as has been pointed out the reaction may be either batch or continuous.

The following examples are provided to illustrate certain specific embodiments of the invention but these examples are not to be construed as limiting the invention solely thereto.

*Example I*

A mixture of 5 grams of silica-alumina catalyst (commercial synthetic silica-alumina cracking catalyst having 25 weight percent alumina, 75 weight percent silica), 3 ml. water and 50 ml. 2,2,4-trimethylpentane was heated to reflux. To this mixture was added 100 ml. of a solution of 10 grams of 1,2-dinitrohexadecane in 2,2,4-trimethylpentane. After refluxing for 2¾ hours the product analyzed 81.7 weight percent nitroolefin, i.e. 1-nitrohexadecene-1. This experiment demonstrates that the aliphatic dinitro compounds can be converted directly to the nitroolefin in high yields.

*Example II*

A mixture of 5 grams of the same silica-alumina catalyst as that employed in Example I together with 100 ml. of a solution of 10 grams of 1-nitrohexadecanol-2 in 2,2,4-trimethylpentane and 1 ml. of water was heated to reflux. A sample removed at the end of 10 minutes analyzed 55.5 weight percent of the nitroolefin (1-nitrohexadecene-1) and 43.5 weight percent of the nitroalcohol after the removal of the solvent. After 25 minutes a sample analyzed 73.5 weight percent nitroolefin and 22.0 weight percent nitroalcohol. An additional 1 ml. of water was added and after 15 minutes additional reaction time a sample of the product analyzed 81.2 weight percent of the nitroolefin and 14.0 weight percent nitroalcohol. This experiment demonstrates that the nitroalcohol may be converted to the nitroolefin by the method of this invention.

*Example III*

A mixture of 3 grams of the same silica-alumina catalyst as that employed in Example I, 20 ml. of water and 50 ml. of 2,2,4-trimethylpentane was heated to reflux. To this mixture was added 100 ml. of a solution of 10 grams of a mixture of 52.5 weight percent 1-nitrohexadecanol-2 and 47.5 weight percent 1,2-dinitrohexadecane in 2,2,4-trimethylpentane. After refluxing 3½ hours the product analyzed 51 weight percent of the nitroalcohol and 39 weight percent of the nitroolefin (1-nitrohexadecene-1). This experiment demonstates that if an excess of water is present it is not possible to dehydrate the nitroalcohol to the nitroolefin but instead there should be only sufficient water to prevent anhydrous conditions as shown in Example II. The excess water, however, does not completely prevent the conversion of the dinitro compound to the nitroolefin.

*Example IV*

A 3 gram sample of the same silica-alumina catalyst employed in Example I was mixed with 10 ml. t-butanol and 90 ml. 2,2,4-trimethylpentane and heated to reflux. Thereafter 100 ml. of a solution containing 10 grams of a mixture of 52.5 weight percent 1,2-dinitrohexadecane and 47.5 weight percent 1-nitrohexadecanol-2 in 2,2,4-trimethylpentane was added to the catalyst mixture. After refluxing for 1 hour at 87° C. the product analyzed 70.4 weight percent nitroolefin and 7.7 weight percent nitroalcohol. This demonstrates that a mixture of the nitroalcohol and dinitroparaffin can be converted to the corresponding nitroolefin.

*Example V*

A solution containing 10 grams of 57.3 weight percent 1-nitrohexadecanol-2 and 33.7 weight percent 1-nitrohexadecene-1 in 2,2,4-trimethylpentane per 100 ml. of the solution was pumped through a 100 gram bed of silica alumina (the same as that employed in Example I) in a steam-jacketed column at a rate of 9 ml. per minute. Three ml. of water was injected into the bottom of the catalyst bed and the run was continued for approximately 2 hours. A sample of the product analyzed 71 weight percent nitroolefin and 11 weight percent nitroalcohol. This experiment shows that a nitroalcohol may be converted continuously to the nitroolefin in the presence of silica-alumina utilizing water to maintain catalyst activity.

*Example VI*

A 2 gram sample of activated alumina (Alcoa F-20 grade) was admixed with 50 ml. of 2,2,4-trimethylpentane and heated to reflux. To this mixture was added 100 ml. of a solution containing 10 grams of a mixture of 52.5 weight percent 1-nitrohexadecanol-2 and 47.5 weight percent 1,2 - dinitrohexadecane in 2,2,4 - trimethylpentane. After refluxing for 3 hours at about 91° C. the product analyzed 65.8 weight percent nitroolefin (1-nitrohexadecene-1) and 10 weight percent nitroalcohol. This experiment demonstated that activated alumina converts a mixture of the nitroalcohol and dinitroparaffin to the corresponding nitroolefin.

*Example VII*

A solution of 1-nitrohexadecanol-2 in 2,2,4-trimethylpentane containing 15 grams of the nitroalcohol per 100 ml. of the solution was passed through a column 4 inches long, ½ inch in diameter containing activated alumina extruded in the form of 1/16 inch diameter pellets at a rate of about 17 ml. per minute and at a temperature of 130° C. The product analyzed 30 weight percent nitroolefin, 50 weight percent nitroalcohol. This experiment also shows that the nitroalcohol may be converted into the nitroolefin continuously over alumina.

*Example VIII*

A solution containing 3 grams of 1-nitrohexadecanol-2 in 20 ml. of toluene was admixed with 1 gram of the same activated alumina employed in Example VI and stirred at 100° C. for 30 seconds. A sample of the product showed 33 weight percent nitroolefin and 47 weight percent unconverted nitroalcohol. When the reaction was carried on for 3 minutes the product showed 60 weight percent nitroolefin.

*Example IX*

A mixture of 3.0 grams of a silica-alumina-magnesia synthetic cracking catalyst containing 85 weight percent silica, 12 weight percent alumina and 3 weight percent magnesia and 50 ml. of 2,2,4-trimethylpentane was heated to reflux and 100 ml. of a solution containing 10 grams of a mixture of 52.5 weight percent of 1-nitrohexadecanol-2 and 47.5 weight percent of 1,2-dinitrohexadecane in 2,2,4-trimethylpentane was added. After refluxing for 1 hour the product analyzed 53.3 weight percent of the nitroolefin and 15.6 weight percent nitroalcohol.

A mixture of 2 grams of a semi-synthetic cracking catalyst (acid activated montmorillonite clay with added alumina to give an alumina content of 48 weight percent) and 50 ml. of 2,2,4-trimethylpentane was heated to about 100° C. and 100 ml. of a solution containing 10 grams of a mixture of 52.5 weight percent of 1-nitrohexadecanol-2 and 47.5 weight percent 1,2-dinitrohexadecane in 2,2,4-trimethylpentane was added. After refluxing for 1 hour it was found that almost complete conversion of the dinitro compound to the nitroolefin had been obtained.

*Example X*

A mixture of 3 grams of silica-alumina the same catalyst as that employed in Example I in 50 ml. of 2,2,4-trimethylpentane was heated to reflux and 50 ml. of a solution of 2,2,4-trimethylpentane containing about 7 grams of a mixture of 1-nitrohexadecanol-2-nitrite and 1,2-dinitrohexadecane were added slowly. The stirred mixture was heated at reflux and at the end of ½ hour a sample was taken and analyzed by infrared analysis. It showed that there was almost complete conversion of the dinitroparaffin and a considerable conversion of the nitronitrite. After a total reaction time of 2 hours the product was almost completely nitroolefin. This experiment shows that a mixture of dinitroparaffin and nitronitrite may be converted to the nitroolefin utilizing a silica-alumina catalyst in accordance with this invention.

*Example XI*

A sample of cyclohexene in 2,2,4-trimethylpentane (10 grams per 100 ml. of solution) was nitrated with an equilibrium mixture of $NO_2$ and $N_2O_4$ at 75° C. by passing the solution and nitrating agent through a water-jacketed glass bead packed column. The excess $NO_2$ was removed by stripping with nitrogen and the mixture hydrolyzed by refluxing with water for 1 hour. The hydrolyzed nitration mixture was stripped under vacuum to remove residual water and solvent.

Three grams of the thus prepared hydrolyzed nitration mixture containing 1,2-dinitrocyclohexane and 2-nitrocyclohexanol in 97 grams of toluene and 5 grams of the same silica-alumina catalyst as that employed in Example I were heated to reflux at 106° C. with stirring. At the end of 3¾ hours an analysis of the product showed that almost all of the diniitroparaffin and nitroalcohol had been converted to the corresponding nitroolefin, 1-nitrocyclohexene.

In this experiment a mixture of dinitroparaffin and nitroalcohol wherein the compounds correspond to the general formula in which R is hydrogen and R′ and R″ are alkyl groups joined together to form a ring are converted to their corresponding nitroolefin.

*Example XII*

A solution of 3.5 grams of 56.3 weight percent 1-phenyl-1,2-dinitroethanol (styrene dinitroparaffin, or styrene DNP) and 40 weight percent of 1-phenyl-1-hydroxy-2-nitroethane (styrene nitroalcohol, styrene NA) in 50 ml. benzene was mixed with 3 grams activated alumina (Alcoa F-20 grade) and stirred for 15 minutes at 60° C. The product contained 37 weight percent styrene NA, 22 weight percent beta-nitrostyrene (styrene nitroolefin, or styrene NO) but no styrene DNP. This experiment shows the conversion of a mixture of dinitroparaffin and nitroalcohol to the corresponding nitroolefin wherein the R of the general formula is phenyl.

Example XIII

A sample of styrene was nitrated with an equilibrium mixture of $NO_2$ and $N_2O_4$ to give a product which by analysis was shown to be a mixture of the styrene DNP and nitronitrite with only a small quantity of the styrene NA. Ten grams of this product were dissolved in 50 ml. of 2,2,4-trimethylpentane and 50 ml. of toluene. This solution was passed through a column (7 inches long by ½ inch diameter) of silica-alumina (same as that of Example I), heated to 80° C. at a rate of 2.2 ml. per minute. The product obtained showed no nitronitrite or dinitro compounds present and was predominantly the nitroolefin with only a small amount of nitroalcohol.

Example XIV

A solution containing 10 grams of a mixture of 52.5 weight percent of 1-nitrohexadecanol-2 and 47.5 weight percent of 1,2-dinitrohexadecane per 100 ml. of a mixture of 10 ml. t-butanol and 90 ml. 2,2,4-trimethylpentane was passed upwardly over 14.9 grams of the same silica-alumina catalyst as that employed in Example I in a column maintained at 81° C. at a rate of about 2 ml. per minute. The product was collected in 100 ml. portions. The analysis of 3 successive portions after removal of the t-butanol and 2,2,4-trimethylpentane in weight percent was as follows:

|  | Nitro-alcohol | Nitro-olefin |
| --- | --- | --- |
| 1st portion | 24.0 | 53.0 |
| 2nd portion | 29.7 | 47.0 |
| 3rd portion | 34.6 | 40.5 |

This experiment shows that in the absence of water added to maintain the activity of the catalyst, the activity of the catalyst decreases during use.

In a second continuous run a solution containing 10 grams of a mixture of 52.5 weight percent of 1-nitrohexadecanol-2 and 47.5 weight percent of 1,2-dinitrohexadecane per 100 ml. of 2,2,4-trimethylpentane was passed upwardly over 100 grams of the same silica-alumina catalyst as that employed in Example I. The catalyst was contained in a steam-jacketed column and the solution was passed upwardly over it at a rate of 6–12 ml. per minute. Two ml. of water were injected into the catalyst bed at the end of 90 minutes and again after 150 minutes of operation. A total of 1,910 ml. of solution were passed through the column during about 4½ hours of operation. An analysis of the product obtained during the first half of the run showed 61.6 weight percent nitroolefin and 11.2 weight percent nitroalcohol. An analysis of the product obtained during the last half of the run showed 58.6 weight percent nitroolefin and 12.5 weight percent nitroalcohol. This experiment demonstrates that the activity of the catalyst is maintained by periodic injection of water into the catalyst.

The foregoing experiments have been selected to show the conversion of individual types of dinitroparaffins, nitroalcohol and nitronitrites as well as various mixtures thereof utilizing a variety of alumina-containing catalysts and a variety of solvents as well as a broad range of reaction conditions. These experiments are provided solely for the purpose of illustrating the broad concept of the instant invention.

We claim:

1. A method for preparing nitrolefins having at least 3 carbon atoms in the molecule and having the formula

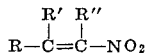

from the corresponding nitro compounds selected from the group consisting of dinitroparaffins having the formula

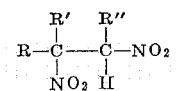

nitroalcohols having the formula

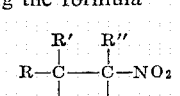

and nitronitrites having the formula

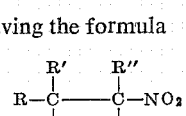

and mixtures thereof, wherein R is selected from the group consisting of hydrogen, an alkyl radical having from 1 to 22 carbon atoms, an aralkyl radical having not more than 22 carbon atoms, an aryl radical, and an alkaryl radical having not more than 22 carbon atoms, R' and R'' are each selected from the group consisting of hydrogen and alkyl radicals having from 1 to 4 carbon atoms, and which also may be joined together to form a ring, which comprises contacting said corresponding nitro compound at a temperature in the range of from 25° C. to 140° C. with an alumina-containing catalyst selected from the group consisting of activated alumina, silica-alumina, and silica-alumina-magnesia.

2. The method according to claim 1 wherein the temperature is in the range of from 60° C. to 110° C.

3. The method according to claim 1 wherein the catalyst is activated alumina.

4. The method according to claim 1 wherein the catalyst is silica-alumina.

5. The method according to claim 1 wherein the catalyst is silica-alumina-magnesia.

6. A method for preparing nitroolefins having at least 3 carbon atoms in the molecule and having the formula

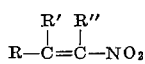

from a mixture of the corresponding dinitroparaffins having the formula

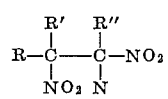

and nitroalcohols having the formula

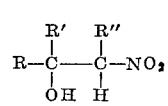

wherein R is selected from the group consisting of hydrogen, an alkyl radical having from 1 to 22 carbon atoms, an aralkyl radical having not more than 22 carbon atoms, an aryl radical, and an alkaryl radical having not more than 22 carbon atoms, R' and R'' are each selected from the group consisting of hydrogen and alkyl radicals having from 1 to 4 carbon atoms, and which also may be joined together to form a ring, which comprises contacting said corresponding nitro compound at a temperature in the range of from 25° C. to 140° C. with an alumina-containing catalyst selected from the group consisting of activated alumina, silica-alumina, and silica-alumina-magnesia.

7. A method for preparing nitroolefins having at least 3 carbon atoms in the molecule and having the formula

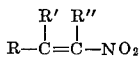

from a mixture of the corresponding dinitroparaffins having the formula

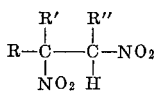

and nitronitrites having the formula

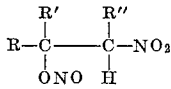

wherein R is selected from the group consisting of hydrogen, an alkyl radical having from 1 to 22 carbon atoms, an aralkyl radical having not more than 22 carbon atoms, an aryl radical, and an alkaryl radical having not more than 22 carbon atoms, R' and R" are each selected from the group consisting of hydrogen and alkyl radicals having from 1 to 4 carbon atoms, and which also may be joined together to form a ring, which comprises contacting said corresponding nitro compound at a temperature in the range of from 25° C. to 140° C. with an alumina-containing catalyst selected from the group consisting of activated alumina, silica-alumina, and silica-alumina-magnesia.

8. A method for preparing nitroolefins having at least 3 carbon atoms in the molecule and having the formula

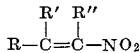

from the corresponding aliphatic nitro compounds selected from the group consisting of dinitroparaffins having the formula

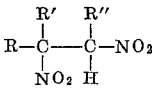

nitroalcohols having the formula

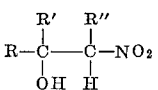

and nitronitrites having the formula

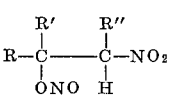

and mixtures thereof, wherein R is selected from the group consisting of hydrogen and an alkyl radical having from 1 to 22 carbon atoms and R' and R" are each selected from the group consisting of hydrogen and alkyl radicals having from 1 to 4 carbon atoms and which also may be joined together to form a ring which comprises dissolving said aliphatic nitro compound in an aliphatic hydrocarbon having from 6 to 24 carbon atoms in the molecule and thereafter contacting the solution at a temperature in the range of from 60° C. to 110° C. with an alumina-containing catalyst selected from the group consisting of activated alumina, silica-alumina and silica-alumina-magnesia.

9. A method for preparing nitroolefins having the formula

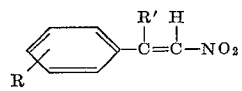

from the corresponding nitro compounds selected from the group consisting of dinitroparaffins having the formula

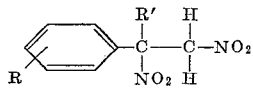

nitroalcohols having the formula

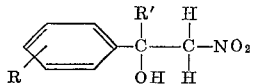

and nitronitrites having the formula

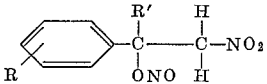

and mixtures thereof, wherein R is selected from the group consisting of hydrogen and an alkyl radical having from 1 to 16 carbon atoms and R' is selected from the group consisting of hydrogen and an alkyl radical having from 1 to 4 carbon atoms which comprises dissolving said nitro compound in a solvent selected from the group consisting of benzene, toluene, xylene and mixtures thereof of which an equal volume of 2,2,4-trimethylpentane and thereafter contacting the solution at a temperature in the range of from 25° C. to 140° C. with an alumina-containing catalyst selected from the group consitsing of activated alumina, silica-alumina and silica-alumina-magnesia.

10. A method for preparing nitroolefins having at least 3 carbon atoms in the molecule and having the formula

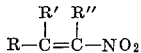

from the corresponding nitro compounds selected from the group consisting of dinitroparaffins having the formula

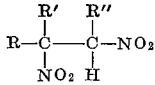

nitroalcohols having the formula

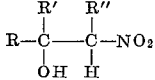

and nitronitrites having the formula

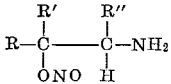

and mixtures thereof, wherein R is selected from the group consisting of hydrogen, an alkyl radical having from 1 to 22 carbon atoms, an aralkyl radical having not more than 22 carbon atoms, an aryl radical, and an alkaryl radical having not more than 22 carbon atoms, R' and R" are each selected from the group consisting of hydrogen and alkyl radicals having from 1 to 4 carbon atoms, and which also may be joined together to form a ring, which comprises dissolving said aliphatic nitro compound in a solvent selected from the group consisting of an aliphatic hydrocarbon having from 6 to 24 carbon atoms in the molecule, an aromatic hydrocarbon selected from the group consisting of benzene, toluene, xylene, mixtures of said aliphatic hydrocarbon with said aromatic hydrocarbon and mixtures of said aliphatic hydrocarbon with t-butanol, the amount of said nitro compound in said solvent being in the range of from 1 to 50 grams per 100 ml. of solvent, contacting the solution at a temperature in the range of from 25° C. to 140° C. with an alumina-containing catalyst selected from the group consisting of activated alumina, silica-alumina and silica-alumina-magnesia and adding from about 0.1 percent to 10 percent by volume of water based on the volume of the solution contacted by said catalyst.

11. The method according to claim 10 wherein said solution is passed continuously over the catalyst and said water is added continuously.

12. The method according to claim 10 wherein said solution is passed continuously over the catalyst and said water is added in increments to the reaction.

References Cited by the Examiner

UNITED STATES PATENTS

| | | | |
|---|---|---|---|
| 2,495,424 | 1/1950 | Scaife et al. | 260—644 |
| 2,656,395 | 10/1953 | Benson | 260—644 |

CARL D. QUARFORTH, *Primary Examiner.*